(12) United States Patent
Asal et al.

(10) Patent No.: US 7,917,753 B2
(45) Date of Patent: Mar. 29, 2011

(54) TRANSFERRING CONTROL BETWEEN PROGRAMS OF DIFFERENT SECURITY LEVELS

(75) Inventors: Michael D. Asal, Austin, TX (US); Anthony J. Lell, Katy, TX (US); Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1354 days.

(21) Appl. No.: 11/383,210

(22) Filed: May 14, 2006

(65) Prior Publication Data

US 2006/0259764 A1 Nov. 16, 2006

Related U.S. Application Data

(60) Provisional application No. 60/681,548, filed on May 16, 2005.

(51) Int. Cl.
*H04L 9/00* (2006.01)
(52) U.S. Cl. .......... 713/166; 713/164; 713/193; 726/26; 726/27
(58) Field of Classification Search .................. 713/166, 713/164, 193; 726/26, 27; 711/163, 164
See application file for complete search history.

(56) References Cited

U.S. PATENT DOCUMENTS

| | | | | |
|---|---|---|---|---|
| 5,604,885 A | * | 2/1997 | Denio | 703/27 |
| 7,401,358 B1 | * | 7/2008 | Christie et al. | 726/21 |

* cited by examiner

*Primary Examiner* — Hosuk Song
*Assistant Examiner* — Baotran N To
(74) *Attorney, Agent, or Firm* — Robert D. Marshall, Jr.; W. James Brady; Frederick J. Telecky, Jr.

(57) ABSTRACT

Systems and methods for transferring control between programs of different security levels are described herein. Some embodiments include a processor capable of operating at one or more security levels including a first and a second security level, a memory system coupled to the processor (the memory system stores a first program that executes on the processor at the first security level, and a second program that executes on the processor at the second security level), and a register configured to store an entry point address to the first program (wherein an instruction that executes on the processor at the second security level is blocked from writing values to the register). A transfer of control from the second program to the first program is executed if the register provides the entry point address. The transfer of control is blocked if the entry point address is not provided by the register.

27 Claims, 3 Drawing Sheets

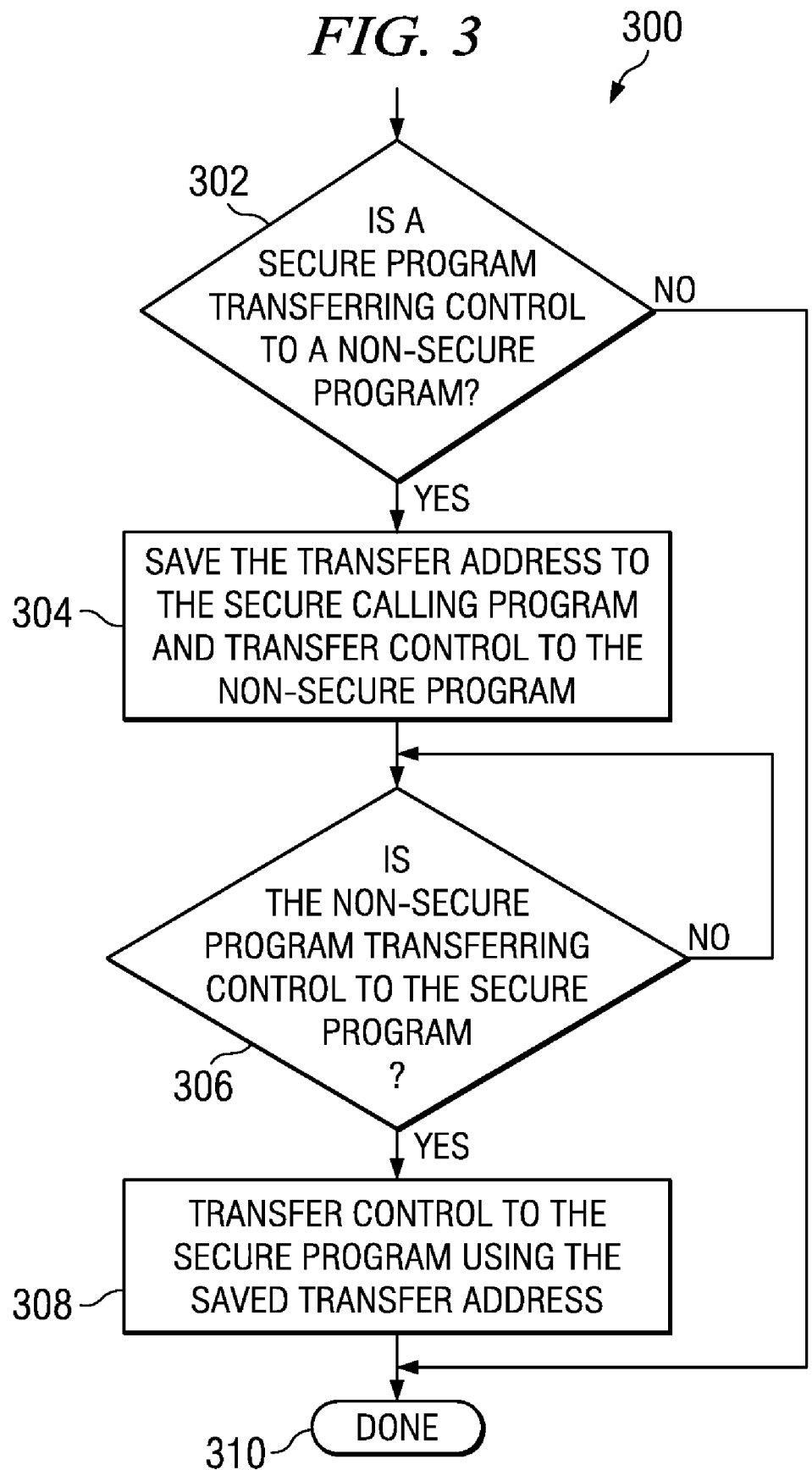

TRANSFERRING CONTROL BETWEEN PROGRAMS OF DIFFERENT SECURITY LEVELS

CROSS-REFERENCE TO RELATED APPLICATIONS

The present application claims the benefit of provisional application Ser. No. 60/681,548, filed May 16, 2005 and entitled "Controlled return to secure code from non-secure code," which is herein incorporated by reference.

BACKGROUND

In recent years it has become increasingly important to provide a secure environment for executing software programs within computer systems. Malicious software programs have increased in sophistication to a point where software-based security solutions, by themselves, frequently fail to provide adequate protection against such malicious programs. For example, buffer overflow attacks, where values stored in memory (e.g., a return address) are selectively replaced by exceeding the boundaries of a data buffer, demonstrate just how sophisticated these malicious programs have become.

Many computers achieve a degree of protection against these malicious programs by segregating the hardware of a system, as well as the software executing on the hardware, into secure and non-secure levels of operation. Hardware is designated as secure, non-secure, or mixed-mode hardware (capable of either secure or non-secure levels of operation). Similarly, software is designated as either secure or non-secure software, and is stored and/or operated within hardware with a matching security designation or level. Thus, for example, secure software is stored in secure memory, and executed on a processor operating at a secure level. Although resources of a given security designation may access resources of an equal or lower designation, a resource is generally prohibited from accessing resources of a higher security designation.

This type of combined hardware and software segregation provides protection by restricting the manner in which secure and non-secure resources interact, and designing at least some of these restrictions into the system hardware. Thus, for example a non-secure program, executing on a processor operating at a non-secure level, is prohibited from accessing a secure resource, such as a value stored within secure memory. A violation of such a restriction may cause the system hardware to generate a trap or exception. The system may be configured to initiate a number of actions in response to the trap or exception. Such actions may include, for example, special software processing of the violation, a system reset, or a system shutdown.

Other security issues may remain in segregated systems, however. For example, although a non-secure resource cannot access a secure resource, a non-secure resource can potentially interfere with calls and returns to and from routines when a system is transitioning between secure and non-secure levels of operation. In systems that monitor violations across security boundaries, such interference with calls and returns may not be detected or prevented since the interference may not violate a security boundary or any other security constraint within the system.

SUMMARY

The present disclosure describes systems and methods for transferring control between programs of different security levels. Some illustrative embodiments include a processor capable of operating at one or more security levels including a first security level and a second security level, a memory system coupled to the processor (the memory system stores a first program that executes on the processor at the first security level, and further stores a second program that executes on the processor at the second security level), and a register configured to store an entry point address to the first program (wherein an instruction that executes on the processor at the second security level is blocked from writing values to the register). A transfer of control from the second program to the first program is executed if the register provides the entry point address to the first program. The transfer of control from the second program to the first program is blocked if the entry point address to the first program is not provided by the register.

Other illustrative embodiments include a method that includes storing a first address of a first program (the first program configured to execute at a first security level), initiating a transfer of control from a second program to the first program (the second program configured to execute at a second security level), completing the transfer of control from the second program to the first program if the stored first address determines the entry point to the first program, and preventing the transfer of control from the second program to the first program if the stored first address is not used to determine the entry point to the first program.

Yet further illustrative embodiments include a processor that includes a processing core capable of operating at one or more security levels comprising a first security level and a second security level, and a register configured to store an entry point address to the first program (wherein an instruction that executes on the processing core at the second security level is blocked from writing values to the register). The processor is configured to couple to a memory system capable of storing a first program that executes on the processing core at the first security level, and further capable of storing a second program that executes on the processing core at the second security level. A transfer of control from the second program to the first program is executed if the register provides the entry point address to the first program, and the transfer of control from the second program to the first program is blocked if the entry point address to the first program is not provided by the register.

BRIEF DESCRIPTION OF THE DRAWINGS

For a detailed description of some illustrative embodiments of the invention, reference will now be made to the accompanying drawings in which:

FIG. 3 shows a method for transferring control between programs, in accordance with at least some illustrative embodiments.

NOTATION AND NOMENCLATURE

Certain terms are used throughout the following discussion and claims to refer to particular system components. This document does not intend to distinguish between components that differ in name but not function. In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

Additionally, the term "system" refers to a collection of two or more parts and may be used to refer to an electronic system such as a computing system or a portion of a computing system. Further, the term "software" includes any executable code capable of running on a processor, regardless of the media used to store the software. Thus, code stored in non-volatile memory, and sometimes referred to as "embedded firmware," is included within the definition of software. Also, the term "program" refers to a specific set or grouping of executable code capable of running on a processor. A program, as used in the present disclosure, is thus intended to refer to a specific instance of the code referenced in the definition of the more general term "software"

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims is limited to that embodiment.

Further, inasmuch as the systems and methods described herein were developed in the context of a digital signal processor ("DSP"), the description herein is based upon a DSP-based system. Nonetheless, the discussion of the various systems and methods in relation to a DSP-based system should not be construed as a limitation as to the applicability of the systems and methods described herein to only DSP-based systems. One of ordinary skill in the art will appreciate that these systems and methods may also be implemented in other computing systems and environments such as general purpose central processing units ("CPUs"), multi-processing units ("MPUs"), and processing cores implemented as part of a processor or a system-on-a-chip ("SOC"), just to name a few examples.

Figure 1:
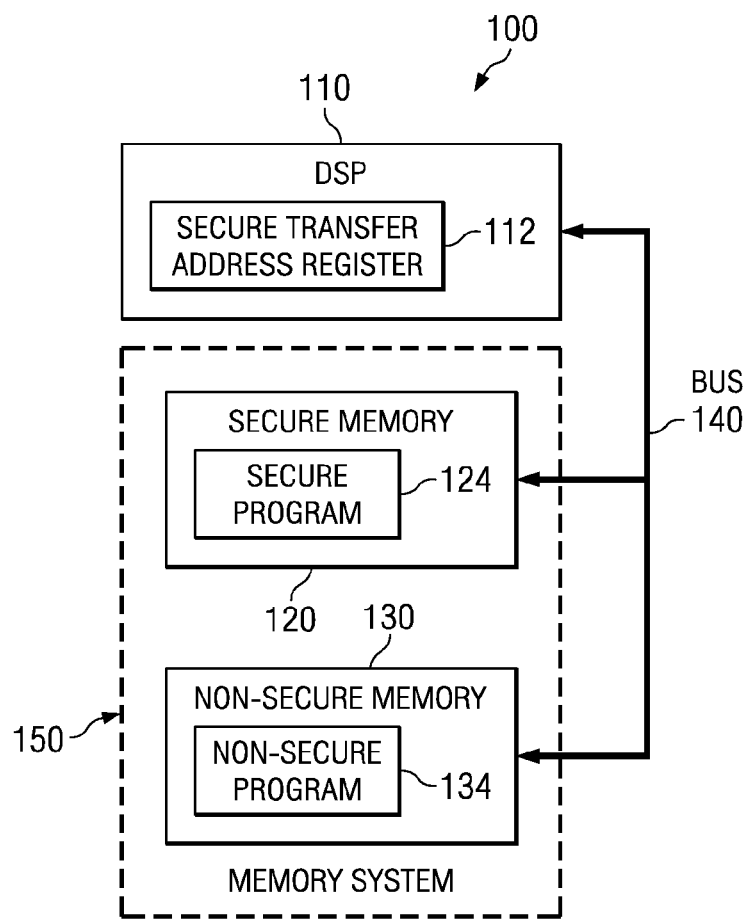
FIG. 1 shows a digital signal processor (DSP)-based computer system, constructed in accordance with at least some illustrative embodiments.

FIG. 1 shows a computer system 100 constructed in accordance with one or more embodiments of the invention, and includes DSP 110 and memory system 150, Memory system 150 includes secure memory 120 and non-secure memory 130. Although memory system 150 includes separate secure and non-secure memories, a single memory, segregated into secure and non-secure regions, may also be used. Further, the memories used within memory system 150 may include a number of different types of volatile and non-volatile memories, such as random access memory ("RAM"), electrically erasable programmable read-only memory ("EEPROM"), and flash memory, just to name a few. Other combinations and segregations of memories, as well as other memory types, will become apparent to those skilled in the art, and all such combinations, segregations and types of memories are intended to be within the scope of the present disclosures.

DSP 110, which includes secure transfer address register 112, couples to secure memory 120 and non-secure memory 130 via bus 140. Secure program 124 is stored within secure memory 120, and non-secure program 134 is similarly stored within non-secure memory 130. When code within secure program 124 is executed by DSP 110, the DSP operates at a secure operational level. Likewise, when code within non-secure program 134 is executed by DSP 110, the DSP operates at a non-secure operational level. It should be noted that the aforementioned security levels operate to restrict how the various hardware and software components of the computer system 100 are allowed to interact. By defining such levels, components operating at one level may be blocked from accessing or interacting with components operating at a higher level. Such security levels may be defined in a number of different ways. For example, in single-stage processor, the security level reflects the security designation of the instruction being executed by the processor. Thus, if a single stage processor is executing an instruction that is part of secure program 124, the processor is operating at a secure level.

Alternatively, if the processor is a pipelined processor with multiple execution stages operating simultaneously, the security level can be applied to each stage independently of some or all other stages, Accordingly, the security level of each stage reflects the security designation of the instruction being processed by that stage. Thus, if an instruction from secure program 124 of FIG. 1 is being processed by an instruction fetch stage while a non-secure instruction from non-secure program 134 is being processed by an instruction decode stage, the instruction fetch stage is operating at a secure level, and the instruction decode stage is operating at a non-secure level. Many alternative ways of designating security levels of a processor or processor stage, applicable to many types of processors, will become apparent to those skilled in the art, and all such designations and processor types are intended to be within the scope of the present disclosure.

As already noted, secure program 124 and non-secure program 134 each contain collections of instructions that may be executed by the DSP 110. Each program may be further subdivided into functional sub-collections of instructions or "routines," each having an entry point and exit point within the program, and each performing a particular function or group of functions. Routines are sometimes referred to by a variety of other names, including subprograms, subroutines, modules, and functions, and programs may include one routine or several routines. All such programs and routines are intended to be encompassed by the present disclosure, regardless of the name used to describe a routine, and regardless of the number of routines within a program.

Secure transfer address register 112 operates to protect the integrity of a transfer of control from a non-secure routine within non-secure program 134 to a secure routine within secure program 124, as each routine is executed in sequence on DSP 110. This protection is provided by using secure transfer address register 112 to store an entry point address of the secure program, and requiring that the non-secure program use only that address to call, return, or branch to the secure program. Protection is further insured in at least some of the illustrative embodiments described herein by restricting access to the secure address transfer register 112. Programs operating at a secure level may read and write to the secure transfer address register 112, but programs operating at a non-secure level may only read the contents of secure transfer address register 112.

Figure 2A:
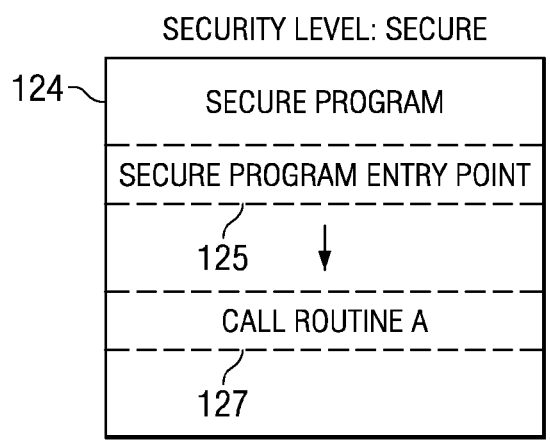
FIGS. 2A through 2C shows a sequence of events for transferring control between programs, in accordance with at least some illustrative embodiments.
Figure 2B:
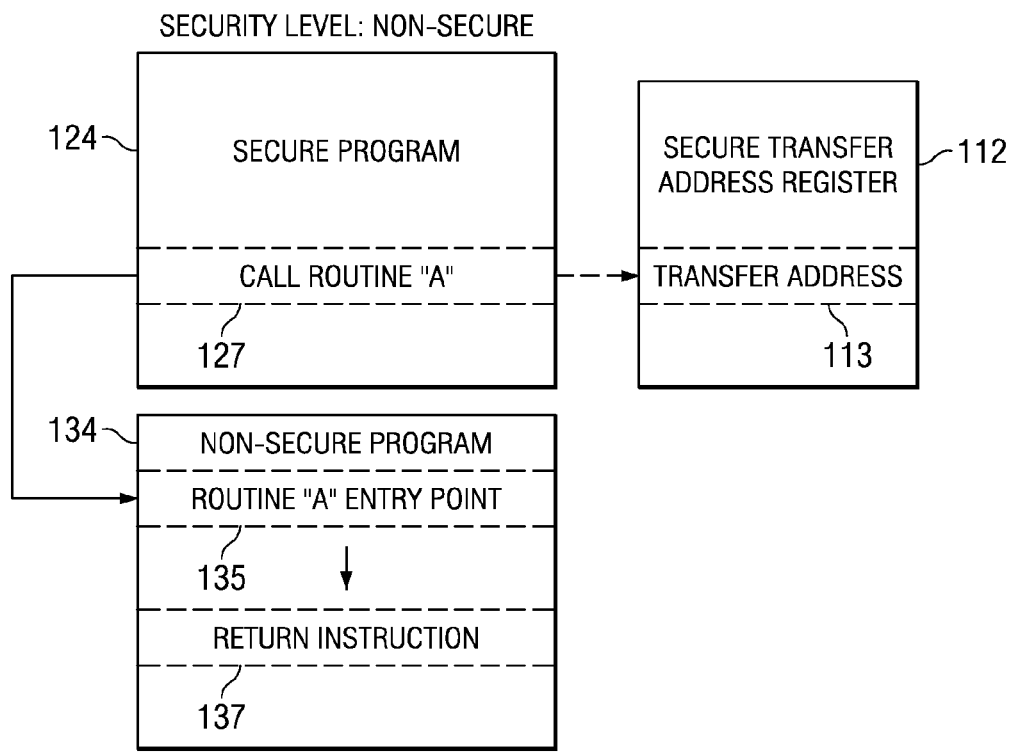
Figure 2C:
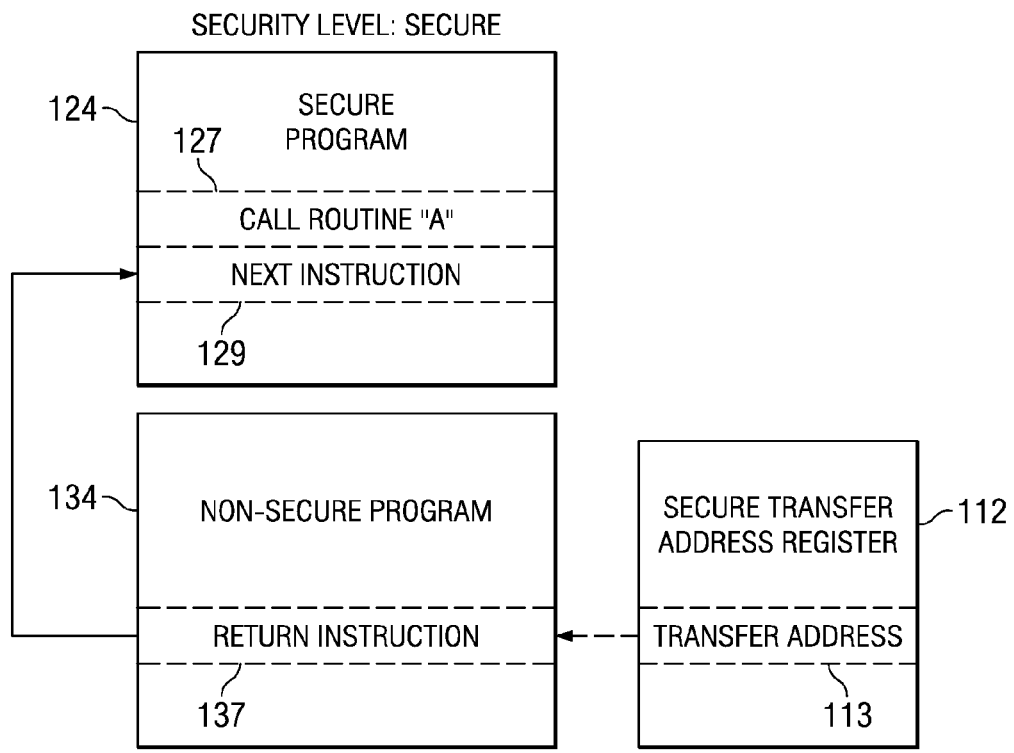

FIGS. 2A through 2C show an example of such a protected control transfer, in accordance with at least some illustrative embodiments FIG. 2A shows secure program 124, executing at a secure level of operation. As one skilled in the art will appreciate, such a secure level or operational mode may be referred to by many other names or designations (e.g., supervisor mode, kernel mode, and protected mode), and all such names or designations, and all such operational levels or modes, are intended to be within the scope of this disclosure, as are similar names and designations frequently used to describe a non-secure level or operational mode (e.g., user mode and public mode).

Continuing to refer to the illustrative embodiment of FIG. 2A, secure program 124 may have one or more programs or routines, and the entry point for one such program is shown as secure program entry point 125. In the example shown, execution of the secure program by the processor (e.g., DSP 110 of FIG. 1) continues at a secure level of operation until the call to routine "A" (127) of non-secure program 134 is reached. Before the call to routine "A" is processed, the processor (or processor stage) operating on the instruction is operating at a secure level. After the call is executed and control is transferred to routine "A", the processor will have transitioned from a secure level of operation to a non-secure level of operation.

Referring to FIG. 2B, upon determining that the target address is an address within non-secure program 134, the return address (transfer address 113) that will be used by the called routine (here routine "A") is stored within secure transfer address register 112 prior to transferring control to the called routine. Once transfer address 113 is stored, control is transferred to entry point 135 of routine "A," and the processor begins executing instructions within non-secure program 134 at a non-secure level of operation.

In at least some illustrative embodiments the determination that the target address is an address within non-secure program 134 may be made when program 124 is created (e.g., using a compiler or an assembler). Upon making such a determination, an instruction is added to secure program 124 which, when executed, causes the return address to be stored as transfer address 113 in secure transfer address register 112. In other illustrative embodiments, hardware within DSP 110 of FIG. 1 detects when a call instruction executing at secure level references a target address of a program located within a non-secure memory address range. Upon detecting such a condition, the transfer address 113 is stored automatically by the hardware in secure transfer address register 112. Other mechanisms for detecting a program branch or call that transfers control from a secure program to a non-secure program, and for executing the save of the transfer address will become apparent to those skilled in the art, and all such detection and saving mechanisms are intended to be within the scope of the present disclosure.

Referring again to FIG. 2B, upon entry into routine "A", the processor (e.g., DSP 110 of FIG. 1), executes instructions of the called program within non-secure program 134 at a non-secure level of operation, until return instruction 137 (which designates the end of the routine "A") is reached. When return instruction 137 is executed, the transfer address 113 stored in secure transfer address register 112 is used to provide the address needed to transfer control back to the calling routine within secure program 124. In the illustrative embodiment shown in FIG. 2C, the transfer address is the address of the instruction following the call instruction that transferred control to Routine "A". As with the call to routine "A," the determination to use the contents of secure transfer address register 112 as the transfer address may be made either when the code for the program within non-secure program 134 is generated (adding the necessary instructions to the code), or upon execution of the return (implementing in hardware the use of the address saved in secure transfer address register 112).

It is possible that a malicious, non-secure program may not use the proper return or call to transfer control to a secure program within secure program 124, instead attempting to transfer control to an address within secure program 124 other than transfer address 113. In at least some of the illustrative embodiments, security logic within the DSP 110 (not shown) is configured to detect attempts at transferring control from a non-secure routine to a secure routine without using secure transfer address register 112. Such detected attempts are treated as security violations, and in response the security logic may trigger, for example, an abort of the program attempting the transfer, a partial or complete reset of DSP 110 or system 100, or an exception to the DSP 110. These responses operate to block the transfer and prevent the malicious code from violating the security constraints of the system.

Although the security logic of the embodiment described is included within DSP 110, in other illustrative embodiments the security logic may be external to DSP 110. The security logic may further be implemented in either hardware or software, or as a combination of both hardware and software. Other implementations for the security logic will become apparent to those skilled in the art, and all such implementations are intended to be within the scope of the present disclosure.

As indicated, in at least some illustrative embodiments the detected security violation triggers an exception to DSP 110. The exception is processed by an exception handler (not shown), which may also be stored in memory system 150 (e.g., in secure memory 120) of FIG. 1. The exception handler processes the security violation by blocking or otherwise preventing the transfer of control. The exception handler may also be configured to take other actions, consistent with existing security responses taken with respect to other security violations defined within the system. Many other security violations, detection mechanisms, and responses will become apparent to those skilled in the art, and all such violations, detection mechanisms and responses are intended to be within the scope of the present disclosure.

FIG. 3 shows a method 300 for transferring control using secure transfer control register 112 of FIG. 1, in accordance with at least some illustrative embodiments of the invention. Although the actions of this method are presented and described serially, one of ordinary skill in the art will appreciate that the order may differ and/or some of the actions may occur in parallel. The method begins by checking if a secure program is transferring control to a non-secure program (block 302). Although the transfer is in the form of a call to a routine in at least some illustrative embodiments, other forms of control transfers (e.g., branches and interrupts) are intended to be within the scope of the present disclosure.

If the secure program is transferring control to a non-secure program, a transfer address is saved and the secure program transfers control to the non-secure program (block 304). The transfer address saved is the address that will be used to return control to the secure program, and may be, for example, the address of the instruction immediately after the instruction transferring control (e.g., after a call instruction). When control is transferred from the secure program to the non-secure program, the system performing the method 300 transitions from a secure level of operation (while executing the secure program) to a non-secure level of operation (while executing the non-secure program).

Once control is transferred to the non-secure program, execution of the non-secure program (operating at a nonsecure level) continues until the non-secure program transfers control to the secure program (block 306). The transfer of control is performed by using the saved transfer address as the entry point to the secure program (block 308). The transfer may be accomplished, for example, by executing a return statement that uses the saved address as an indirect addressing argument. The transfer of control from the non-secure program to the secure program also causes a change in the security level of the system performing the method 300. The system thus transitions from a non-secure level of operation when executing the non-secure program, to a secure level of operation when executing the secure program, completing the method 300 (block 310).

Although the above method describes transitions between security levels associated with the system performing the method, in other illustrative embodiments the system performing the method described may have multiple stages, each operating upon different instructions from different programs, and each operating at a distinct security level (e.g., secure or non-secure). Also, although two security levels are described, other illustrative embodiments may have any number of security levels. Many embodiments that encompass systems with any number of stages and security levels will become apparent to those skilled in the art, and all such systems are intended to be within the scope of the present disclosure.

The above disclosure is meant to be illustrative of the principles and various embodiments of the present invention. Numerous variations and modifications will become apparent to those skilled in the art once the above disclosure is fully appreciated. For example, although secure transfer address register 112 of FIG. 1 is shown as an internal register within DSP 110, the register may also be implemented as a dedicated external register, or as a memory mapped register located within secure memory 120. It is intended that the following claims be interpreted to embrace all such variations and modifications.

What is claimed is:

1. A system, comprising:
   a processor configured to operate at a plurality of security levels comprising a first security level and a second security level;
   a memory system coupled to the processor, the memory system stores a first program that executes on the processor at the first security level, and further stores a second program that executes on the processor at the second security level; and
   a register configured to store an entry point address to the first program, wherein an instruction that executes on the processor at the second security level is blocked from writing values to the register;
   wherein a transfer of control from the second program to the first program is executed if the register provides the entry point address to the first program;
   wherein the transfer of control from the second program to the first program is blocked if the entry point address to the first program is not provided by the register; and
   wherein an exception is signaled to the processor indicative of a security violation when the transfer of control from the second program to the first program is not provided by the register, and wherein an exception handler, executed by the processor in response to the exception, blocks the transfer of control.

2. The system of claim 1, wherein the first program stores the entry point address in the register before the transfer of control to the second program, and wherein the processor executes at least part of the second program after the processor executes at least part of the first program.

3. The system of claim 1, wherein the first security level is at a higher security level than the second security level.

4. The system of claim 1, wherein the first security level corresponds to a secure operational level, and wherein the second security level corresponds to a non-secure operational level.

5. The system of claim 1, wherein when the transfer of control from the second program to the first program is not provided by the register, the transfer of control from the second program to the first program is blocked by aborting the first program without executing the transfer of control.

6. The system of claim 1, wherein when the transfer of control from the second program to the first program is not provided by the register, the transfer of control from the second program to the first program is blocked by resetting the processor without executing the transfer of control.

7. The system of claim 1, wherein the register is included within the processor.

8. The system of claim 1, wherein the register is included within the memory system.

9. The system of claim 1, wherein the processor is a pipelined processor, and wherein a first pipeline stage operates at the first security level, and a second pipeline stage operates at the second security level.

10. The system of claim 1, wherein the processor is a digital signal processor.

11. The system of claim 1, wherein the memory system comprises a first memory that operates at the first security level and stores the first program, and wherein the memory system further comprises a second memory that operates at the second security level and stores the second program.

12. A method, comprising:
   operating, on a processor, at a plurality of security levels comprising a first security level and a second security level;
   storing, in a memory system, a first program and a second program;
   storing, in a register, the first address of the first program, the first program configured to execute on the processor at the first security level, wherein an instruction that executes on the processor at the second security level is blocked from writing values to the register;
   initiating a transfer of control from the second program to the first program, the second program configured to execute on the processor at a second security level;
   completing the transfer of control from the second program to the first program if the register contains the first address;
   preventing the transfer of control from the second program to the first program if the register does not contain the first address;
   indicating a security violation if the transfer of control from the second program to the first program is prevented; and
   signaling an exception to the processor if the security violation is indicated; wherein an exception handler, executed by the processor in response to the exception, prevents the transfer of control.

13. The method of claim 12, further comprising preventing the second program from modifying the stored first address.

14. The method of claim 12, further comprising transferring control from the first program to the second program before transferring control from the second program to the first program.

15. The method of claim 12, wherein the first security level corresponds to a secure operational level, and wherein the second security level corresponds to a non-secure operational level.

16. The method of claim 12 further comprising aborting the first program without executing the transfer of control if the security violation is indicated, thereby preventing the transfer of control from the second program to the first program.

17. The method of claim 12 further comprising resetting the processor without executing the transfer of control if the security violation is indicated, thereby preventing the transfer of control from the second program to the first program.

18. The method of claim 12, wherein the processor is a pipelined processor, and wherein a first pipeline stage operates at the first security level, and a second pipeline stage operates at the second security level.

19. A processor, comprising:
a processing core configured to operate at a plurality of security levels comprising a first security level and a second security level, and a register configured to store an entry point address to the first program, wherein an instruction that executes on the processing core at the second security level is blocked from writing values to the register;
wherein the processor is configured to couple to a memory system configured to store a first program that executes on the processing core at the first security level, and further configured to store a second program that executes on the processing core at the second security level;
wherein a transfer of control from the second program to the first program is executed if the register provides the entry point address to the first program, and the transfer of control from the second program to the first program is blocked if the entry point address to the first program is not provided by the register; and
wherein an exception is signaled to the processing core indicative of a security violation when the transfer of control from the second program to the first program is not provided by the register, and wherein an exception handler, executed by the processing core in response to the exception, blocks the transfer of control.

20. The processor of claim 19, wherein the first program, while executing on the processing core, stores the entry point address in the register before the transfer of control to the second program, and wherein the processing core executes at least part of the second program after executing at least part of the first program.

21. The processor of claim 19, wherein the first security level is at a higher security level than the second security level.

22. The processor of claim 19, wherein the first security level corresponds to a secure operational level, and wherein the second security level corresponds to a non-secure operational level.

23. The processor of claim 19, wherein when the transfer of control from the second program to the first program is not provided by the register, the transfer of control from the second program to the first program is blocked by aborting the first program without executing the transfer of control.

24. The processor of claim 19, wherein when the transfer of control from the second program to the first program is not provided by the register, the transfer of control from the second program to the first program is blocked by resetting the processor without executing the transfer of control.

25. The processor of claim 19, wherein the processing core is a pipelined processing core, and wherein a first pipeline stage operates at the first security level, and a second pipeline stage operates at the second security level.

26. The processor of claim 19, wherein the processor is a digital signal processor.

27. A system, comprising:
a processor configured to operate at a plurality of security levels comprising a first security level and a second security level;
a memory system coupled to the processor, the memory system stores a first program that executes on the processor at the first security level, and further stores a second program that executes on the processor at the second security level; and
a register configured to store an entry point address to the first program, wherein an instruction that executes on the processor at the second security level is blocked from writing values to the register;
wherein a transfer of control from the second program to the first program is executed if the register provides the entry point address to the first program;
wherein the transfer of control from the second program to the first program is blocked if the entry point address to the first program is not provided by the register; and
wherein when the transfer of control from the second program to the first program is not provided by the register, the transfer of control from the second program to the first program is blocked either by aborting the first program without executing the transfer of control or by resetting the processor without executing the transfer of control.

* * * * *